Patented Aug. 20, 1929.                            1,725,651

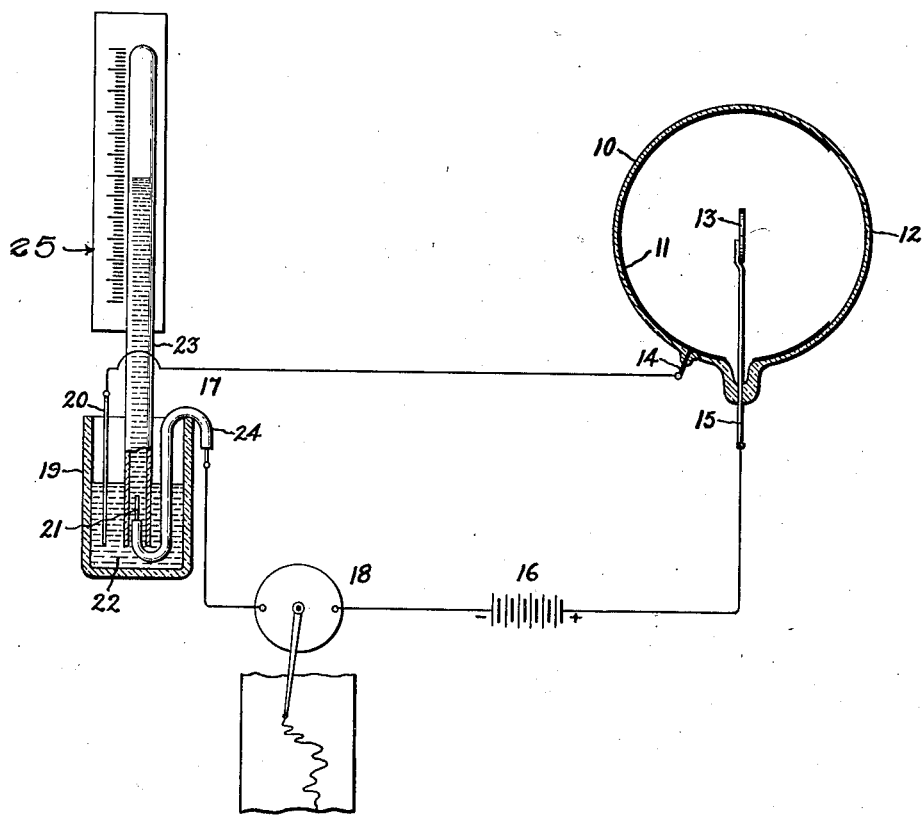

UNITED STATES PATENT OFFICE.

LEWIS R. KOLLER, OF SCHENECTADY, NEW YORK, ASSIGNOR TO GENERAL ELECTRIC COMPANY, A CORPORATION OF NEW YORK.

LIGHT MEASUREMENT.

Application filed October 14, 1927. Serial No. 226,243.

My invention relates to a method and apparatus for measuring light. For example, weather bureaus are interested in determining the fluctuations in daylight and the average daylight values over a given period of time such as a day or month. My invention relates to a simple and accurate means for accomplishing these measurements.

In carrying my invention into effect I prefer to make use of a photo-electric cell and an electrolytic meter. The electrolytic meter is connected in an electric circuit with the photo-electric cell in such manner as to produce an integration of the light value to which the cell is exposed. Electric recording means for recording the fluctuations in light values may also be included in the circuit.

The features of my invention which are believed to be novel and patentable will be pointed out in the claims appended hereto. For a better understanding of my invention reference is made in the following description to the accompanying drawing which represents a preferred arrangement of apparatus for carrying out the invention comprising a photo-electric cell and an electrolytic meter.

Referring to the drawing the photo-electric cell preferably comprises a sealed glass container 10 containing a light sensitive cathode 11 and an anode 13. The cathode may comprise a silver mirror coated with caesium or potassium. It will cover a substantial portion of the interior surface leaving an uncovered area for a window at 12. The anode 13 at the center of the container may be of nickel or any other suitable conductor. For daylight measurement I have found that a cell of this character about seven inches in diameter gives excellent results without the necessity of amplifying the current through the cell. The cell is preferably gas-filled. The gas may be argon at about .02 millimeters pressure for a seven inch cell. Electric terminals 14 and 15 are sealed into the cell and connected to the cathode and anode respectively. The cell is connected in series with a constant voltage source 16 and an electrolytic meter 17 and if desired an electrical recording meter represented at 18. The source 16 may comprise a 45 volt storage battery with its positive terminal connected to the anode terminal 15 of the photo-electric cell.

The electrolytic meter represented at 17 preferably comprises a vessel 19 made of insulating material such as glass and contains electrodes 20 and 21 spaced apart in the vessel and connected in the electric circuit of the photo-electric cell, an electrolytic solution 22 and an inverted tube 23 for collecting and measuring the gas liberated at the cathode 21 of the electrolytic cell. The anode 20 may be of platinum or some other material which will not dissolve in the electrolyte solution used and the cathode 21 may be of copper. The cathode wire is partially covered with glass or some other insulating material as represented at 24 so that only the end contained within the tube 23 is exposed to the electrolyte. Thus all of the gas liberated will be collected in the tube 23. The electrolyte solution may be a solution of water and sulphuric acid and should preferably contain a coloring material so as to facilitate reading of the liquid column in the tube 23. The coloring material may be chromic acid or some other material that will not be bleached by the sulphuric acid. Adjacent the upper closed end of tube 23 is a scale 25 suitably calibrated with the apparatus and graduated in units corresponding to daylight values.

The electric recording instrument at 18 when employed is of usual construction of sufficient sensitivity to be operated by the small current flowing in its circuit.

The operation is as follows: The tube 23 is first filled with the electrolyte and inverted in the vessel 19 over the cathode 21. The photo-electric cell is turned so that its window 12 is exposed to the light to be measured. The light rays cause the liberation of electrones and electron current flow to the anode in proportion to the light value. A corresponding current flows in the electric circuit containing the electrolytic meter 17 and the recording galvanometer 18. The current flows through the electrolyte between cathode and anode and hydrogen gas is liberated at the cathode by the electrolytic action in proportion to the current flowing or in proportion to the light value. It rises and collects in the upper end of tube 23 displacing the electrolyte therein. Thus the column of hydrogen in the tube 23 represents an integration of the daylight values while the instantaneous fluctuating values are recorded at 18. The capacity of the tube 23 may be made anything desired. Depending on its capacity the tube will be refilled with electrolyte periodically, as once a month or once a day, or whenever the gas column reaches the lower limit of the scale.

In accordance with the provisions of the Patent Statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

1. The method of integrating light values which consists in producing a flow of electric current proportional to the light to be measured, producing an electrolytic action by such current and measuring the gas liberated by such electrolytic action over a period of time.

2. Apparatus for integrating light values comprising an electric circuit containing a source of supply, a light sensitive cell exposed to the light to be integrated and an electrolytic cell, and means for collecting and measuring the gas liberated in the electrolytic cell by reason of the current flowing therein.

In witness whereof, I have hereunto set my hand this 13th day of October, 1927.

LEWIS R. KOLLER.